United States Patent
Lee et al.

(10) Patent No.: US 8,360,609 B2
(45) Date of Patent: Jan. 29, 2013

(54) ILLUMINATION APPARATUS AND DRIVING METHOD THEREOF

(75) Inventors: Young Hwan Lee, Seoul (KR); Kwan Soo Jang, Seoul (KR); Chung Hyun Cho, Goyang-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 595 days.

(21) Appl. No.: 12/615,170

(22) Filed: Nov. 9, 2009

(65) Prior Publication Data

US 2010/0118555 A1 May 13, 2010

Related U.S. Application Data

(60) Provisional application No. 61/113,568, filed on Nov. 11, 2008, provisional application No. 61/113,543, filed on Nov. 11, 2008.

(30) Foreign Application Priority Data

Nov. 11, 2008 (KR) .................. 10-2008-0111898
Nov. 11, 2008 (KR) .................. 10-2008-0111900

(51) Int. Cl.
*F21S 4/00* (2006.01)
(52) U.S. Cl. ............... 362/249.07; 362/287; 362/217.17
(58) Field of Classification Search ............. 362/249.03, 362/249.06, 249.07, 249.1, 249.11, 285, 362/287, 398, 427, 217.01, 225, 217.16, 362/217.17
See application file for complete search history.

(56) References Cited

U.S. PATENT DOCUMENTS

| | | | |
|---|---|---|---|
| 4,782,432 A * | 11/1988 | Coffman ...................... 362/184 |
| 5,442,258 A | 8/1995 | Shibata |
| 5,580,158 A * | 12/1996 | Aubrey et al. ................ 362/640 |
| 5,758,959 A | 6/1998 | Sieczkowski |
| 5,759,054 A | 6/1998 | Spadafore |
| 5,924,784 A | 7/1999 | Chliwnyj et al. |
| 6,431,723 B1 | 8/2002 | Schubert et al. |
| 6,787,999 B2 | 9/2004 | Stimac et al. |
| 6,853,151 B2 | 2/2005 | Leong et al. |
| 6,997,576 B1 | 2/2006 | Lodhie et al. |
| 7,049,761 B2 | 5/2006 | Timmermans et al. |
| 7,125,159 B2 | 10/2006 | Hirsch et al. |
| 7,344,275 B2 | 3/2008 | Allen et al. |
| 7,597,456 B2 | 10/2009 | Catalano et al. |
| 7,641,364 B2 | 1/2010 | Abbondanzio et al. |
| 7,932,679 B2 | 4/2011 | Ball |
| 8,033,686 B2 | 10/2011 | Recker et al. |
| 8,035,307 B2 | 10/2011 | Chew |
| 8,093,823 B1 | 1/2012 | Ivey et al. |
| 2006/0193131 A1 | 8/2006 | McGrath et al. |
| 2006/0203482 A1 | 9/2006 | Allen et al. |
| 2009/0103331 A1 | 4/2009 | Pazula et al. |

* cited by examiner

*Primary Examiner* — Vip Patel
(74) *Attorney, Agent, or Firm* — The Law Offices of Andrew D. Fortney; Andrew D. Fortney

(57) ABSTRACT

An illumination apparatus includes an adapter configured to be detachably and electrically connected to a socket and configured to convert alternating power into driving power; a light emitting device illumination part including a light emitting device that is configured to be detachably and electrically connected to the adapter and to emit light according to the driving power from the adapter; and an illumination direction controller that controls an illumination direction of the light emitting device.

20 Claims, 6 Drawing Sheets

ILLUMINATION APPARATUS AND DRIVING METHOD THEREOF

The present application claims priority under 35 U.S.C. §119(e) of Korean Patent Application Nos. 10-2008-0111898 (filed on Nov. 11, 2008) and 10-2008-0111900 (filed on Nov. 11, 2008), and U.S. Provisional Application Nos. 61/113,568 (filed on Nov. 11, 2008) and 61/113,543 (filed on Nov. 11, 2008), which are hereby incorporated by reference in their entireties.

BACKGROUND

DESCRIPTION OF THE RELATED ART

Embodiments of the invention relate to an illumination apparatus and a driving method thereof.

At the present time, a fluorescent lamp or an incandescent lamp has been widely used as an illumination apparatus. In particular, the fluorescent lamp has low power consumption and high brightness so that it has been widely used at office or at home.

Meanwhile, an illumination apparatus that replaces the fluorescent lamp or the incandescent lamp has been recently developed and, representatively, an illumination apparatus using a light emitting diode (LED) has been introduced.

However, in the case of the illumination apparatus using the LED, it is driven with different voltage from the fluorescent lamp or the incandescent lamp, causing a problem that all of power supply apparatus including conventionally installed sockets should be replaced when using the illumination apparatus using the LED.

SUMMARY OF THE INVENTION

Embodiments of the invention provide an illumination apparatus with a new structure using a LED or an OLED, and a driving method thereof.

Various embodiments provide an illumination apparatus using the LED or the OLED that can be used without replacing a power supply apparatus for a conventional fluorescent lamp, an incandescent lamp, a halogen lamp, etc., and a driving method thereof.

Various embodiments provide an illumination apparatus that can compatibly use various light emitting device illumination parts by detachably installing an adapter and a light emitting device illumination part.

Various embodiments provide an illumination apparatus that can control an illumination direction by controlling each light emitting device in a desired direction.

An illumination apparatus according to the embodiments includes an adapter that is configured to be detachably and electrically connected to a socket and that converts alternating power into driving power; a light emitting device illumination part including a light emitting device and that is configured to be detachably and electrically connected to the adapter, the light emitting device being configured to emit light according to the driving power from the adapter; and an illumination direction controller that controls an illumination direction of the light emitting device.

An illumination apparatus according to the embodiments includes an adapter that is configured to be detachably and electrically connected to a socket of an illumination apparatus; a substrate that is configured to be detachably and electrically connected to the adapter; a hinge on the substrate; a light emitting device on the hinge; and an electromagnet on one of the substrate and the light emitting device and a permanent magnet on the other of the substrate and the light emitting device.

A method of driving an illumination apparatus according to the embodiments includes converting alternating power into driving power in an adapter; emitting light from a light emitting device according to the driving power in a light emitting device illumination part including the light emitting device, the light emitting device illumination part being configured to be detachably and electrically connected to the adapter; and controlling an illumination direction of the light emitting device according to an illumination direction controller that controls the illumination direction of the light emitting device.

DETAILED DESCRIPTION OF THE EMBODIMENTS

Figure 1:
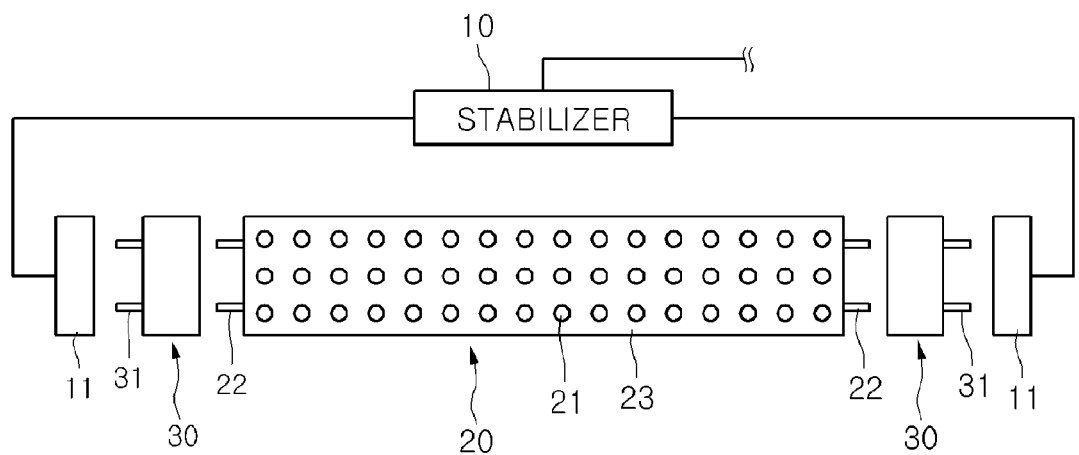
FIG. 1 is a diagram explaining an illumination apparatus according to a first embodiment.

In the drawings, the thickness or size of each layer is exaggerated, omitted or schematically illustrated for the convenience and clarity of explanation. Also, the size of each constituent does not completely reflect its actual size.

Hereinafter, an illumination apparatus according to various embodiments will be described with reference to the accompanying drawings.

Figure 2:
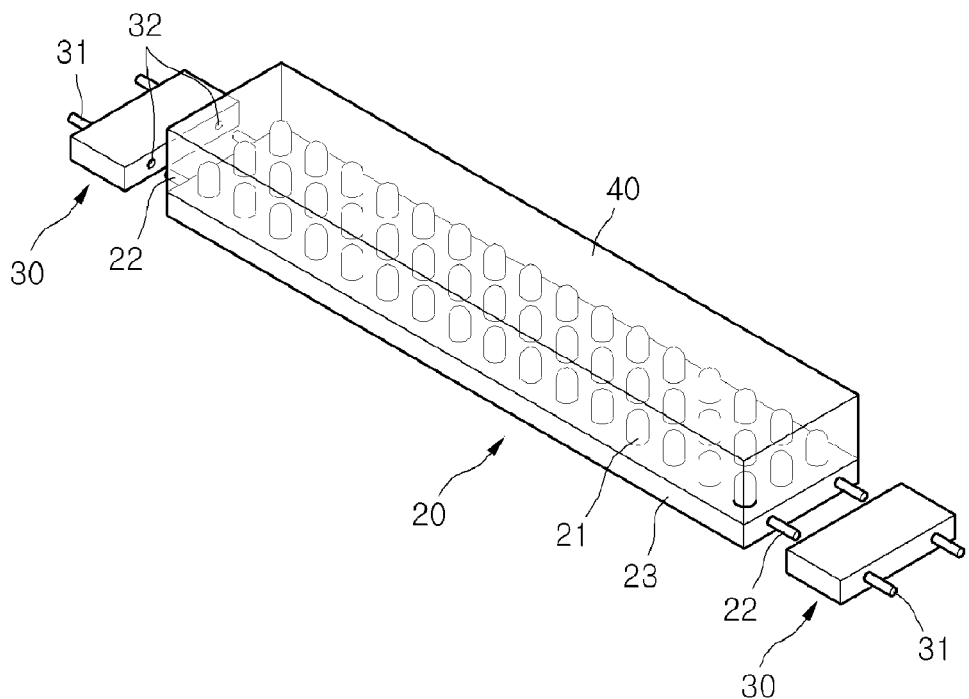
FIG. 2 is a perspective view of the illumination apparatus according to the first embodiment.
Figure 3:
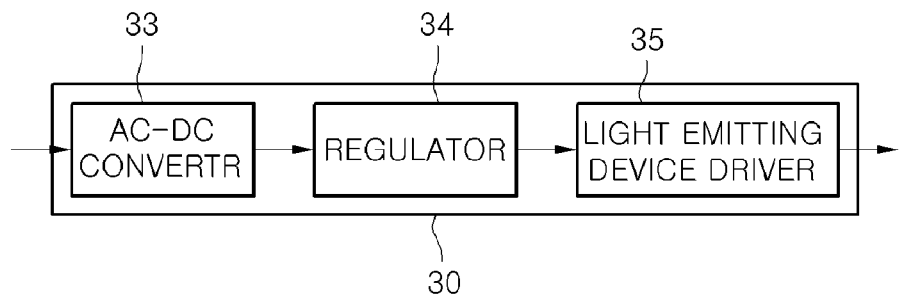
FIG. 3 is a diagram explaining an adapter in the illumination apparatus according to the first embodiment.

FIG. 1 is a diagram explaining an illumination apparatus according to a first embodiment, FIG. 2 is a perspective view of the illumination apparatus according to the first embodiment, and FIG. 3 is a diagram explaining an adapter in the illumination apparatus according to the first embodiment.

First, referring to FIGS. 1 and 2, the illumination apparatus according to the first embodiment includes a power terminal 22 formed at opposite ends of a substrate 23, a light emitting device illumination part 20 having a plurality of light emitting devices 21 on the upper surface of the substrate 23, and an adapter coupled at opposite sides of the light emitting device illumination part 20. Moreover, a cover 40 that protects the light emitting devices 21 may further be installed on the substrate 23.

In the light emitting device illumination part 20, the plurality of light emitting devices 21 are arranged on the substrate 23. The light emitting devices 21 may be LED or OLED.

The substrate 23 may be a printed circuit board (PCB) on which a circuit pattern for providing power to the light emitting devices 21 is formed. Also, the substrate 23 may include a substrate with wiring for providing power to the light emitting devices 21, on or as part of a plastic instrument.

Moreover, a reflective coating layer (not shown) may be formed on the surface of the substrate 23, making it possible to increase efficiency of light emitted from the light emitting devices 21 by coating it with silver (Ag) or aluminum (Al).

The plurality of light emitting devices 21 may include LEDs or OLEDs that emit red, blue, and/or green light, and may also include LEDs or OLEDs that emit white light.

The cover 40 may be formed of transparent plastic material, and may also be formed of plastic with various colors such as red, green, blue, etc., as needed. Also, the cover 40 may be formed of translucent material and in this case, it may also provide an illumination with a soft atmosphere.

The power terminals 22 that can be electrically connected to the adapter 30 are at opposite ends of the substrate 23, thereby supplying power to the light emitting devices 21 from the outside.

The adapter 30 includes a connector 31 at one side and inserted into a socket 11 of a conventional fluorescent lamp, and a power terminal groove 32 formed at the other side and into which the power terminal 22 of the light emitting device illumination part 20 are inserted.

The light emitting device illumination part 20 is coupled to the adapter 30 so that the illumination apparatus according to the first embodiment can be installed at the socket 11 where a conventional fluorescent lamp is located. Therefore, a power supply apparatus including the socket 11 of the conventional fluorescent lamp can use an illumination apparatus with an LED or OLED.

In particular, since the light emitting device illumination part 20 and the adapter 30 are detachably installed, when defects are generated on the light emitting device illumination part 20 or the adapter 30, only the light emitting device illumination part 20 or the adapter 30 where the defects are generated can be replaced, having low maintenance costs.

Moreover, since the light emitting device illumination part 20 and the adapter 30 are detachably installed, illuminations with various atmospheres can be provided by replacing only the light emitting device illumination part 20.

Figure 4:
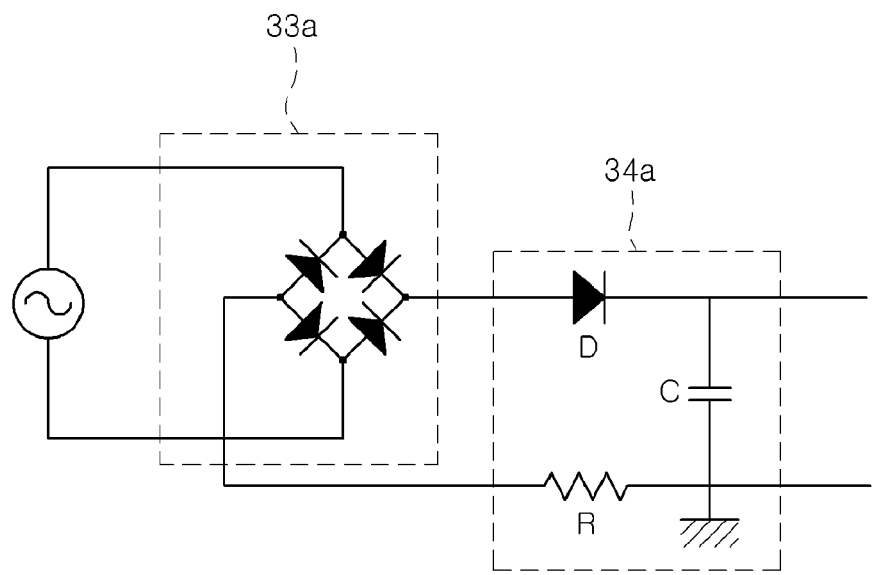
FIG. 4 is a diagram showing an AC-DC converter and a regulator of the adapter in the illumination apparatus according to the first embodiment.

Referring to FIG. 3, the adapter 30 includes an AC-DC converter 33, a regulator 34, and a light emitting device driver 35. The AC-DC converter 33 converts AC power supplied through the socket 11 into DC power, the regulator 34 allows the DC power output from the AC-DC converter 33 to be output as constant DC voltage, and the light emitting device driver 35 outputs the DC voltage supplied from the regulator 34 as driving pulse proper in driving the plurality of light emitting devices 121. For example, as shown in FIG. 4, the adapter 30 includes a bridge rectifier 33a and a smoothing circuit 34a to allow constant DC voltage to be output.

Therefore, the light emitting device illumination part 20 can also be used in the power supply apparatus for the conventional fluorescent lamp to which the AC power is supplied by the adapter 30 that includes the AC-DC converter 33, the regulator 34, and the light emitting device driver 35.

In other words, as shown in FIG. 1, the power supply apparatus for the fluorescent lamp includes a stabilizer 10 that converts commercial power into high frequency current of 20-50 kHz and two sockets 11 connected to the stabilizer 10, wherein only high frequency AC current is provided through the sockets 11 so that the light emitting device illumination part 20 cannot be installed directly on or connected directly to a conventional power supply apparatus.

However, the illumination apparatus according to the first embodiment includes the adapter 30, making it possible to use the light emitting device illumination part 20, while using the conventional power supply apparatus as it is.

Moreover, since the adapter 30 and the light emitting device illumination part 20 are detachable, the illumination apparatus can be used to be connected to only the light emitting device illumination part 20 by separating the adapter 30 from the light emitting device illumination part 20 where the power supply apparatus for the light emitting device illumination part 20 is installed.

Figure 5:
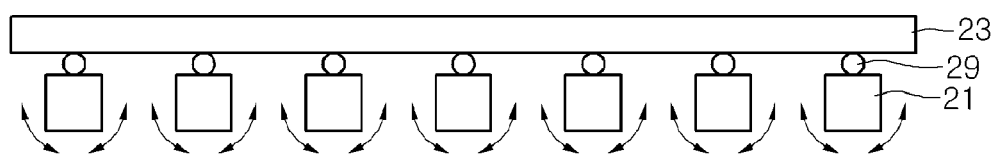
FIGS. 5 to 7 are diagrams showing an operation of a light emitting device in an illumination apparatus according to a first embodiment.
Figure 6:
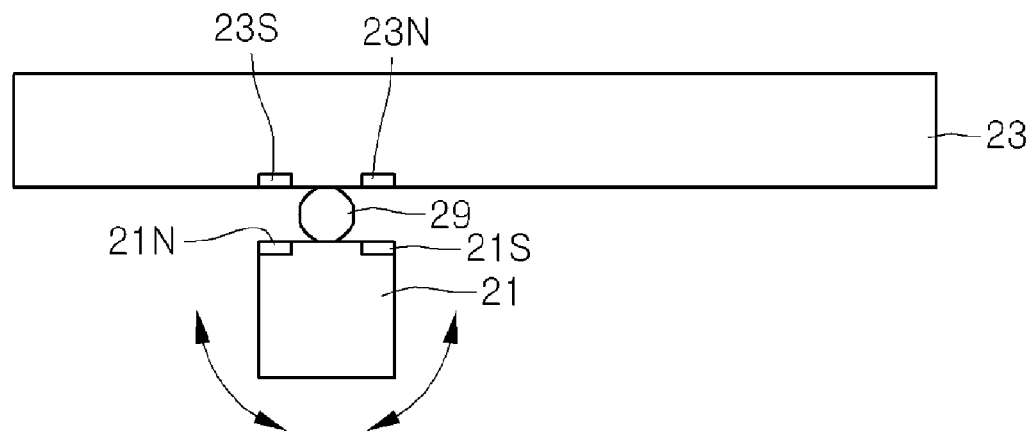
Figure 7:
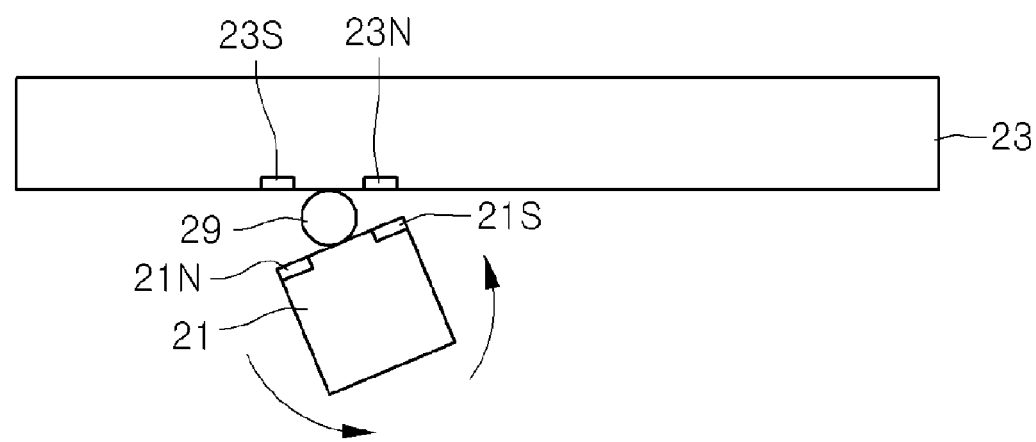

FIGS. 5 to 7 are diagrams showing an operation example of a light emitting device 21 in an illumination apparatus according to a first embodiment.

The first embodiment may provide an illumination apparatus that can control each light emitting device 21 in a desired direction to control an illumination direction.

For example, the illumination apparatus according to the first embodiment may further include a hinge 29 formed between the substrate 23 and the light emitting device 21. Therefore, in the first embodiment, the light emitting device 21 can change the illumination direction in a desired direction. The illumination apparatus according to the first embodiment can be effectively used in an environment where freely changing the illumination direction is effective.

In the first embodiment, the method for changing the direction of the light emitting device 21 can be performed by labor force using the hinge 29. For example, a person using the illumination apparatus according to the first embodiment can control the direction of the light emitting device 21.

Further, in the first embodiment, the light emitting device 21 can change the illumination direction by the force of a magnet.

For example, the first embodiment may include permanent magnets 21N and 21S that are formed in the light emitting device 21 and electromagnets 23S and 23N that are formed in the substrate 23. For example, the first embodiment may include the permanent magnets 21N and 21S that are formed in the light emitting device 21 and the electromagnets 23S and 23N that are formed in the substrate 23. The permanent magnets 21N and 21S and the electromagnets 23S and 23N function as an illumination direction controller that can control the illumination direction of the light emitting device 21.

The electromagnets 23S and 23N may selectively be magnetized by a method of applying and blocking electricity to the electromagnets 23S and 23N that are formed on the substrate. For example, as shown in FIG. 7, when the N type electromagnet 23N on the substrate 23 is magnetized, it responds to the S type permanent magnet 21S of the light emitting device 21 such that the light emitting device 21 can move in the direction of the N type electromagnet 23N on the substrate 23.

The first embodiment may provide an illumination apparatus that can control each light emitting device 21 in a desired direction to control an illumination direction.

Figure 8:
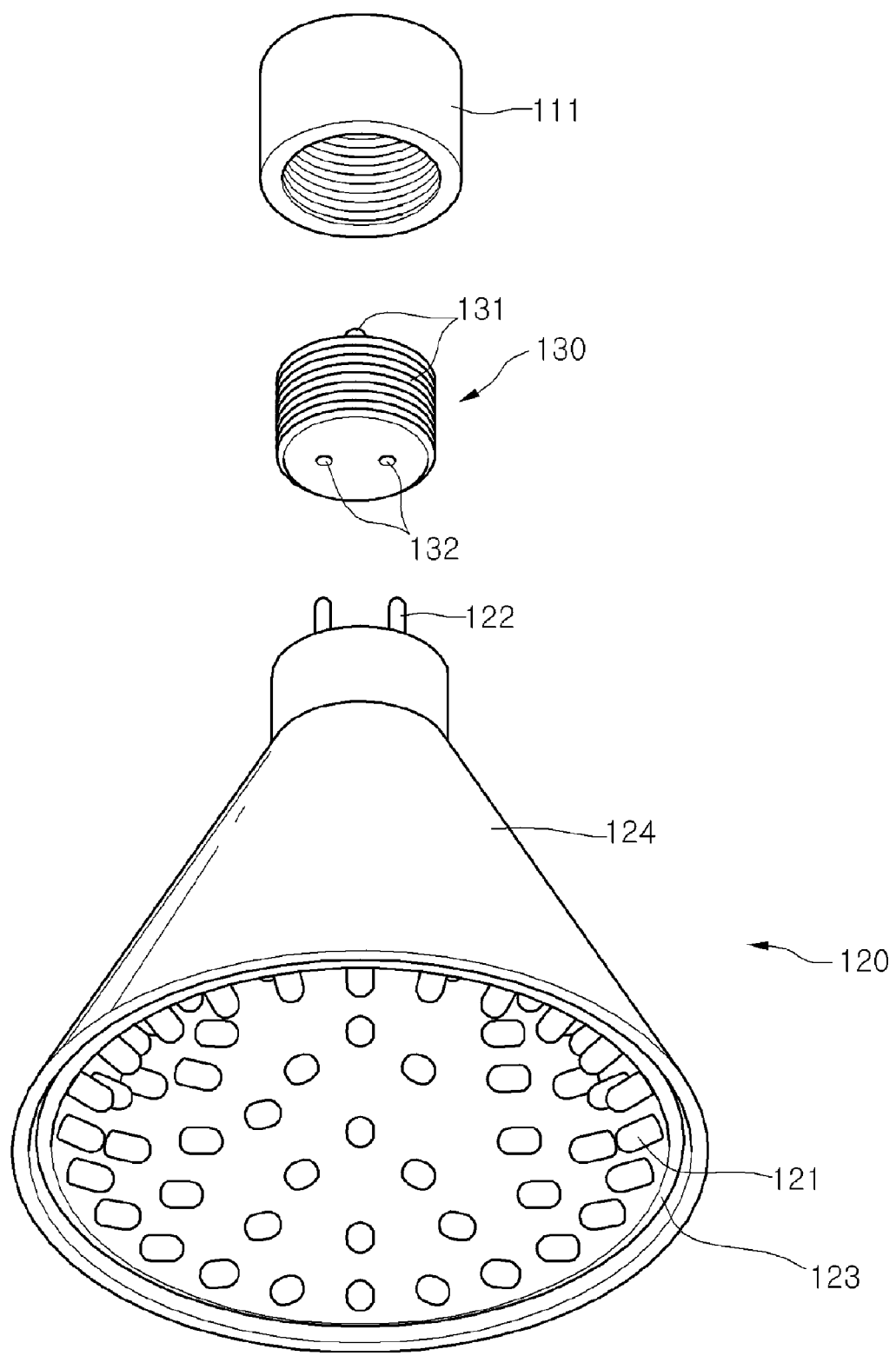
FIG. 8 is a diagram for explaining an illumination apparatus according to a second embodiment.
Figure 9:
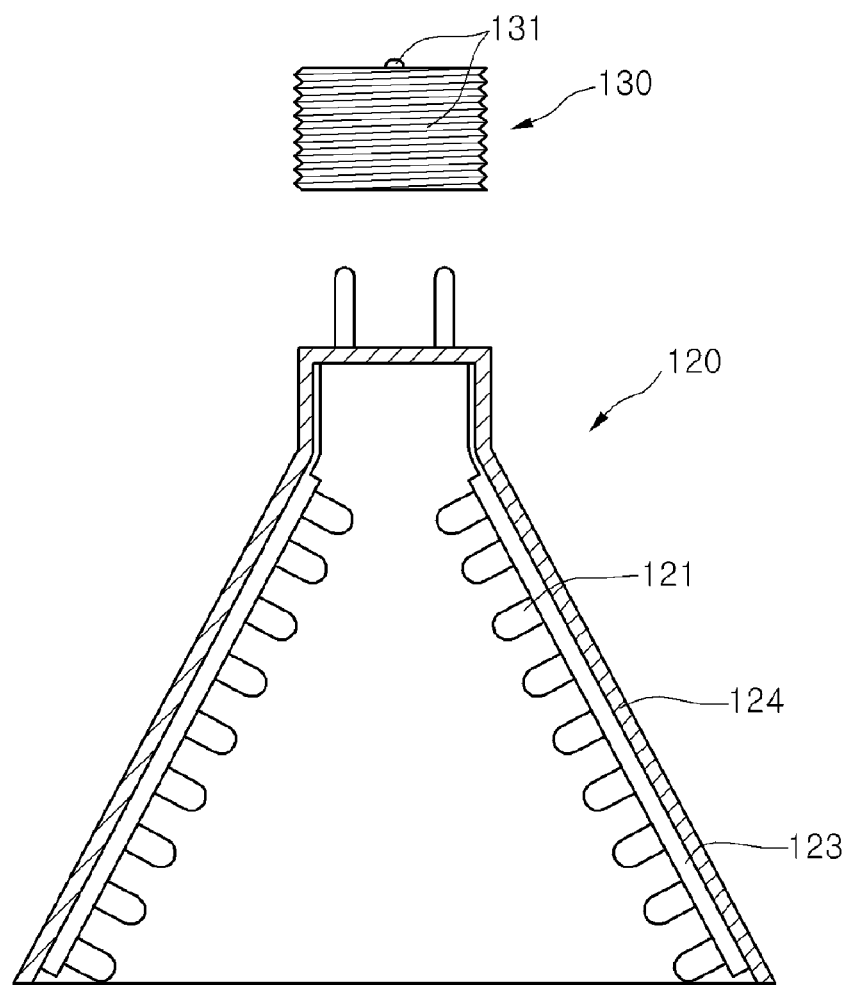
FIG. 9 is a cross-sectional view of the illumination apparatus according to the second embodiment.

FIG. 8 is a diagram for explaining an illumination apparatus according to a second embodiment and FIG. 9 is a cross-sectional view of the illumination apparatus according to the second embodiment.

First, referring to FIGS. 8 and 9, the illumination apparatus according to the second embodiment includes an adapter 130 that can be connected to a socket 111 of an incandescent lamp, a halogen lamp, etc., and a light emitting device illumination part 120 in a cone shape that is detachably connected to the adapter 130.

The adapter 130 is formed with spiral protrusions to be connected to the socket 111 and is provided with a connection terminal 131 that is electrically connected to the socket 111 and a power terminal groove 132 that is electrically connected to the light emitting device illumination part 120.

The light emitting device illumination part 120 includes a power terminal 122 that is inserted into the power terminal groove or socket 132 to be electrically connected thereto, a housing 124 on which the power terminal 122 is installed, and a substrate 123 that is connected to the housing 124, and the plurality of light emitting devices 121 that are on the substrate 123. The light emitting device 121 may be an LED or an OLED.

The substrate 123 may be a printed circuit board (PCB) on which a circuit pattern for providing power to the light emitting device 121 is formed. In addition, the substrate 123 may be a substrate including wiring for providing power to the light emitting devices 21 on, in or as part of a plastic instrument. The substrate 123 is electrically connected to the power terminal 122.

In addition, a reflective coating layer (not shown) may be formed on the surface of the substrate 123, making it possible to increase efficiency of light emitted from the light emitting devices 121 by coating it with silver (Ag) or aluminum (Al).

In the second embodiment, the substrate 123 is formed in a cone shape and is inserted and installed inside the housing 124. The substrate 123 and the light emitting device 121 on the substrate 123 are surrounded by the housing 124.

Therefore, the second embodiment may provide the illumination apparatus that can concentrate the illumination.

The plurality of light emitting devices 121 may include an LED or an OLED that can emit red, blue, and green light and an LED or an OLED that can emit white light.

The illumination apparatus according to the second embodiment may be installed in the existing incandescent lamp or halogen lamp socket, etc., by connecting the light emitting device illumination part 120 and the adapter 130.

In addition, in the illumination apparatus according to the second embodiment, the adapter 130 converts the AC power applied to the existing incandescent lamp, the halogen lamp, etc., into the DC power, thereby driving the light emitting device 121.

Therefore, various embodiments can use the illumination apparatus using an LED or the OLED without replacing the power supply apparatus including a socket 111 for an existing incandescent lamp, a halogen lamp, etc.

In particular, since the light emitting device illumination part 120 and the adapter 130 are detachably installed, when defects are generated on the light emitting device illumination part 120 or the adapter 130, only the light emitting device illumination part 120 or the adapter 130 where the defects are generated can be replaced, having low maintenance costs.

Moreover, since the light emitting device illumination part 120 and the adapter 130 are detachably installed, illuminations with various atmospheres can be provided by replacing only the light emitting device illumination part 120.

The adapter 130 may have the same structure as the adapter 30 described in FIG. 3.

The illumination apparatus according to the second embodiment includes the adapter 130, making it possible to use the light emitting device illumination part 120, while using the conventional power supply apparatus as it is.

Moreover, since the adapter 130 and the light emitting device illumination part 120 are detachable, the illumination apparatus can be connected to only the light emitting device illumination part 120 by separating the adapter 130 from the light emitting device illumination part 120 where the power supply apparatus for the light emitting device illumination part 20 is installed.

Figure 10:
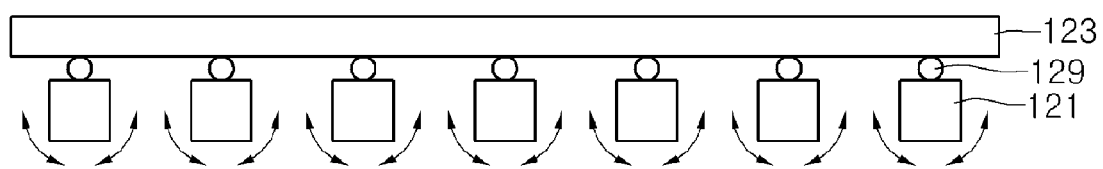
FIGS. 10 to 12 are diagrams showing the operation of the light emitting device in the illumination apparatus according to the second embodiment.
Figure 11:
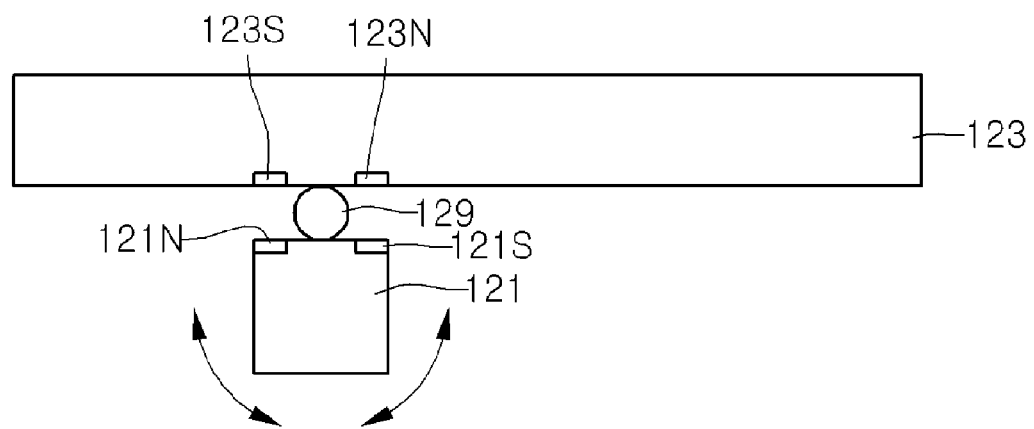
Figure 12:
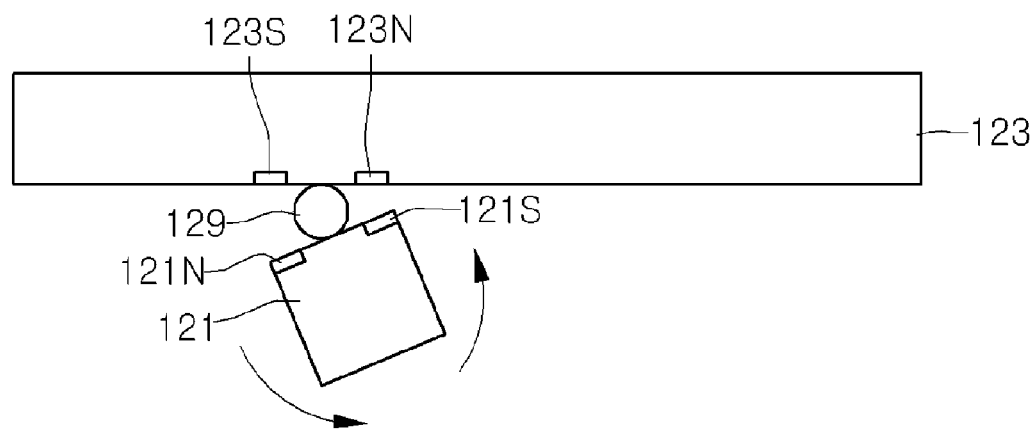

FIGS. 10 to 12 are diagrams showing an operation example of the light emitting device 121 in the illumination apparatus according to the second embodiment.

The second embodiment may provide the illumination apparatus that can control each light emitting device 121 in a desired direction to control an illumination direction.

For example, the illumination apparatus according to the second embodiment may further include a hinge 129 formed between the substrate 123 and the light emitting device 121. Therefore, in the second embodiment, the light emitting device 121 can change the illumination direction in a desired direction. The illumination apparatus according to the second embodiment can be effectively used in an environment where freely changing the illumination direction is effective.

In the second embodiment, the method for changing the direction of the light emitting device 121 can be performed by labor force using the hinge 129. For example, a person using the illumination apparatus according to the second embodiment can control the direction of the light emitting device 121.

Further, in the second embodiment, the light emitting device 121 can change the illumination direction by the force of a magnet.

For example, the second embodiment may include permanent magnets 121N and 121S that are formed in the light emitting device 121 and electromagnets 123S and 123N that are formed in the substrate 123. The permanent magnets 121N and 121S and the electromagnets 123S and 123N function as an illumination direction controller that can control the illumination direction of the light emitting device 121.

The electromagnets 123S and 123N may selectively be magnetized by a method of applying and blocking electricity to the electromagnets 123S and 123N that are formed on the substrate. For example, as shown in FIG. 12, when the N type electromagnet 123N on the substrate 123 is magnetized, it responds to the S type permanent magnet 121S of the light emitting device 121 such that the light emitting device 121 can move in the direction of the N type electromagnet 123N on the substrate 123.

The second embodiment may provide the illumination apparatus that can control each light emitting device 121 in a desired direction to control an illumination direction.

Embodiments of the invention can provide an illumination apparatus having a new structure using LEDs or OLEDs.

Various embodiments can provide the illumination apparatus using the LEDs or the OLEDs without replacing the power supply apparatus for the existing fluorescent lamp, incandescent lamp, halogen lamp, etc.

Embodiments of the invention can provide an illumination apparatus that can compatibly use various light emitting device illumination parts by detachably installing or connecting the adapter and a light emitting device illumination part.

Various embodiments also provide an illumination apparatus that can control an illumination direction of the light emitting device(s) by controlling each light emitting device in a desired direction.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is within the purview of one skilled in the art to effect such feature, structure, or characteristic in connection with other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination apparatus, comprising:
   an adapter configured to be detachably and electrically connected to a socket and configured to convert alternating power into driving power;
   a light emitting device illumination part including a light emitting device, the light emitting device illumination part being configured to be detachably and electrically connected to the adapter, and the light emitting device being configured to emit light according to the driving power from the adapter; and
   an illumination direction controller configured to control an illumination direction of the light emitting device.

2. The illumination apparatus according to claim 1, wherein the light emitting device comprises a light-emitting diode (LED) or an organic light-emitting diode (OLED).

3. The illumination apparatus according to claim 1, wherein the illumination direction controller includes a hinge that rotatably supports the light emitting device.

4. The illumination apparatus according to claim 1, wherein the illumination direction controller includes a permanent magnet and an electromagnet configured to rotate the light emitting device.

5. The illumination apparatus according to claim 1, wherein the adapter includes:
   an AC-DC converter that converts an AC voltage into a DC voltage;
   a regulator that receives the DC voltage from the AC-DC converter and outputs a constant DC voltage; and
   a light emitting device driver that outputs the constant DC voltage from the regulator as one or more driving pulses.

6. The illumination apparatus according to claim 1, wherein the adapter includes:
   a connection terminal configured to be connected to a fluorescent lamp socket; and
   a power terminal groove or socket configured to be connected to the power terminal of the light emitting device illumination part.

7. The illumination apparatus according to claim 1, wherein the adapter includes:
   a connection terminal configured to be connected to an incandescent lamp socket or a halogen lamp socket; and
   a power terminal groove or socket configured to be connected to the power terminal of the light emitting device illumination part.

8. The illumination apparatus according to claim 1, wherein the light emitting device illumination part includes:
   a substrate;
   a plurality of light emitting devices on the substrate; and
   a power terminal at opposite ends of the substrate configured to be coupled to the adapter.

9. The illumination apparatus according to claim 8, further comprising a cover spaced from the light emitting devices and configured to protect the plurality of light emitting devices.

10. The illumination apparatus according to claim 8, wherein the substrate has a plate shape.

11. The illumination apparatus according to claim 8, wherein the substrate has a cone shape.

12. An illumination apparatus, comprising:
    an adapter configured to be detachably and electrically connected to a socket of an illumination apparatus;
    a substrate configured to be detachably and electrically connected to the adapter;
    a hinge on the substrate;
    a light emitting device on the hinge; and
    an electromagnet on or in one of the substrate and the light emitting device and a permanent magnet on or in the other one of the substrate and the light emitting device, wherein the electromagnet and the permanent magnet control an illumination direction of the light emitting device.

13. The illumination apparatus according to claim 12, wherein the illumination apparatus socket is configured to be detachably connected to a fluorescent lamp, an incandescent lamp, or a halogen lamp.

14. The illumination apparatus according to claim 12, wherein the substrate has a plate form.

15. The illumination apparatus according to claim 12, wherein the substrate has a cone shape.

16. The illumination apparatus according to claim 12, wherein the adapter includes:
    a connection terminal configured to be connected to the illumination apparatus socket;
    an AC-DC converter that converts an AC voltage from the connection terminal into a DC voltage;
    a regulator that receives the DC voltage from the AC-DC converter and outputs a constant DC voltage;
    a light-emitting device driver that generates one or more driving pulses from the constant DC voltage from the regulator; and
    a power terminal groove or socket that provides the driving pulse(s) from the light emitting device driver.

17. A method of driving an illumination apparatus, comprising:
    converting alternating power into driving power in an adapter;
    emitting light from a light emitting device according to the driving power, the light emitting device being including on a light emitting device illumination part configured to be detachably and electrically connected to the adapter; and
    controlling an illumination direction of the light emitting device according to an illumination direction controller that controls the illumination direction of the light emitting device.

18. The method according to claim 17, wherein the light emitting device is supported by a hinge, and the illumination direction is controlled by an interaction of a permanent magnet and an electromagnet controlled by the illumination direction controller.

19. The method according to claim 17, wherein the permanent magnet is in or on the light emitting device, and the electromagnet is on a substrate of the light emitting device illumination part opposite to the permanent magnet.

20. The method according to claim 17, wherein the substrate has a cone shape.

* * * * *